United States Patent [19]
Olms

[11] Patent Number: 5,927,782
[45] Date of Patent: Jul. 27, 1999

[54] OVERHEAD TRUCK RACK AND CORNER BRACKET

[75] Inventor: Joseph Jeffery Olms, Salinas, Calif.

[73] Assignee: Tailgater, Salinas, Calif.

[21] Appl. No.: 09/030,698

[22] Filed: Feb. 25, 1998

[51] Int. Cl.⁶ ...................................................... B60P 3/00
[52] U.S. Cl. .............................. 296/3; 224/402; 224/403; 211/182
[58] Field of Search ................................ 296/3; 224/402, 224/403, 405; 211/182, 162, 175; 52/731.7, 731.6, 735.1, 737.6

[56] References Cited

U.S. PATENT DOCUMENTS

| | | | |
|---|---|---|---|
| 738,163 | 9/1903 | Clutter | 52/737.6 |
| 810,001 | 1/1906 | Sullivan et al. | 52/737.6 |
| 2,196,399 | 11/1940 | Rubel | 52/737.6 |
| 2,382,583 | 8/1945 | Scheyer | 52/737.6 |
| 3,263,692 | 8/1966 | Questi et al. | 211/182 |
| 3,300,940 | 1/1967 | Golasz | 52/737.6 |
| 4,398,763 | 8/1983 | Louw | 224/405 |
| 4,405,170 | 9/1983 | Raya | 296/10 |
| 4,423,899 | 1/1984 | Langmead | 296/3 |
| 4,600,232 | 7/1986 | Phillips | 296/3 |
| 4,770,458 | 9/1988 | Burke et al. | 296/3 |
| 4,789,229 | 12/1988 | Porcaro et al. | 211/182 |
| 5,061,000 | 10/1991 | Haugen et al. | 296/3 |
| 5,108,141 | 4/1992 | Anderson | 286/3 |
| 5,494,327 | 2/1996 | Derecktor | 296/3 |
| 5,692,791 | 12/1997 | Sulzer | 224/403 |

*Primary Examiner*—Joseph D. Pape
*Assistant Examiner*—Kiran Patel
*Attorney, Agent, or Firm*—Patrick T. King

[57] ABSTRACT

An overhead truck rack is provided for a pickup truck which includes four one-piece corner brackets to each of which are fastened: one end a longitudinal rail, one end of a lateral rail, and an upper end of a leg. A corner bracket includes a horizontally disposed, one-piece, cantilevered top crosspiece to which is fastened one of the pair of longitudinal rails. Each of the corner brackets also includes two integral, spaced-apart side panels which downwardly depend from the top crosspiece. Between the spaced-apart side panels are positioned an end of one of the lateral rails and between the spaced-apart side panels is pivotably mounted an upper end of one of the legs to allow for lateral movement of the lower end of the legs to allow for adjustment of the lateral spacing of the lower ends of the legs. The lower ends of the legs are connected to respective brackets at respective mounting points on the body of the pickup truck. Each of the corner brackets also includes four integral support ribs which are connected a lower side of the cantilevered top piece and the outer sides of the two side panels to provide additional strength to the corner brackets.

24 Claims, 5 Drawing Sheets

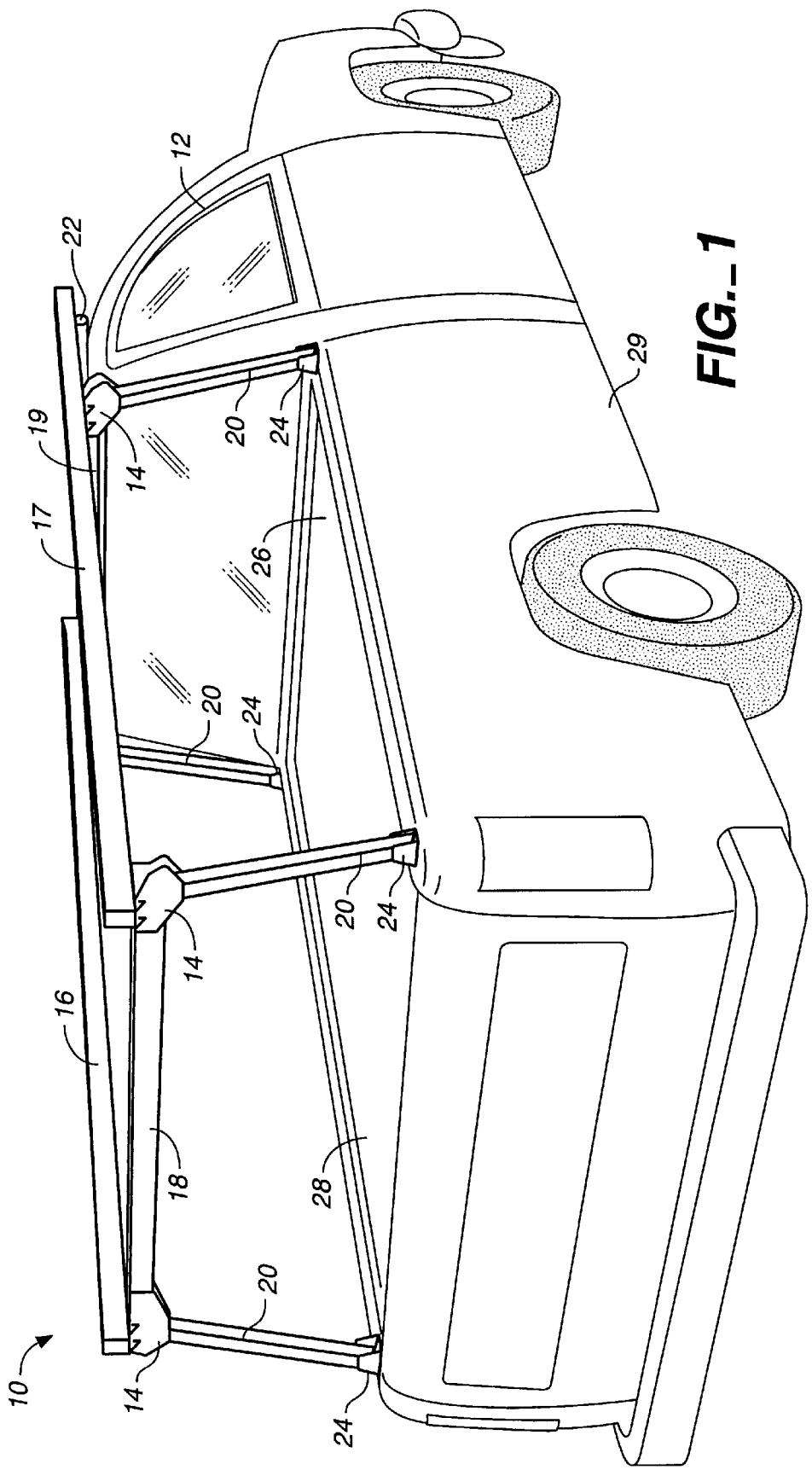

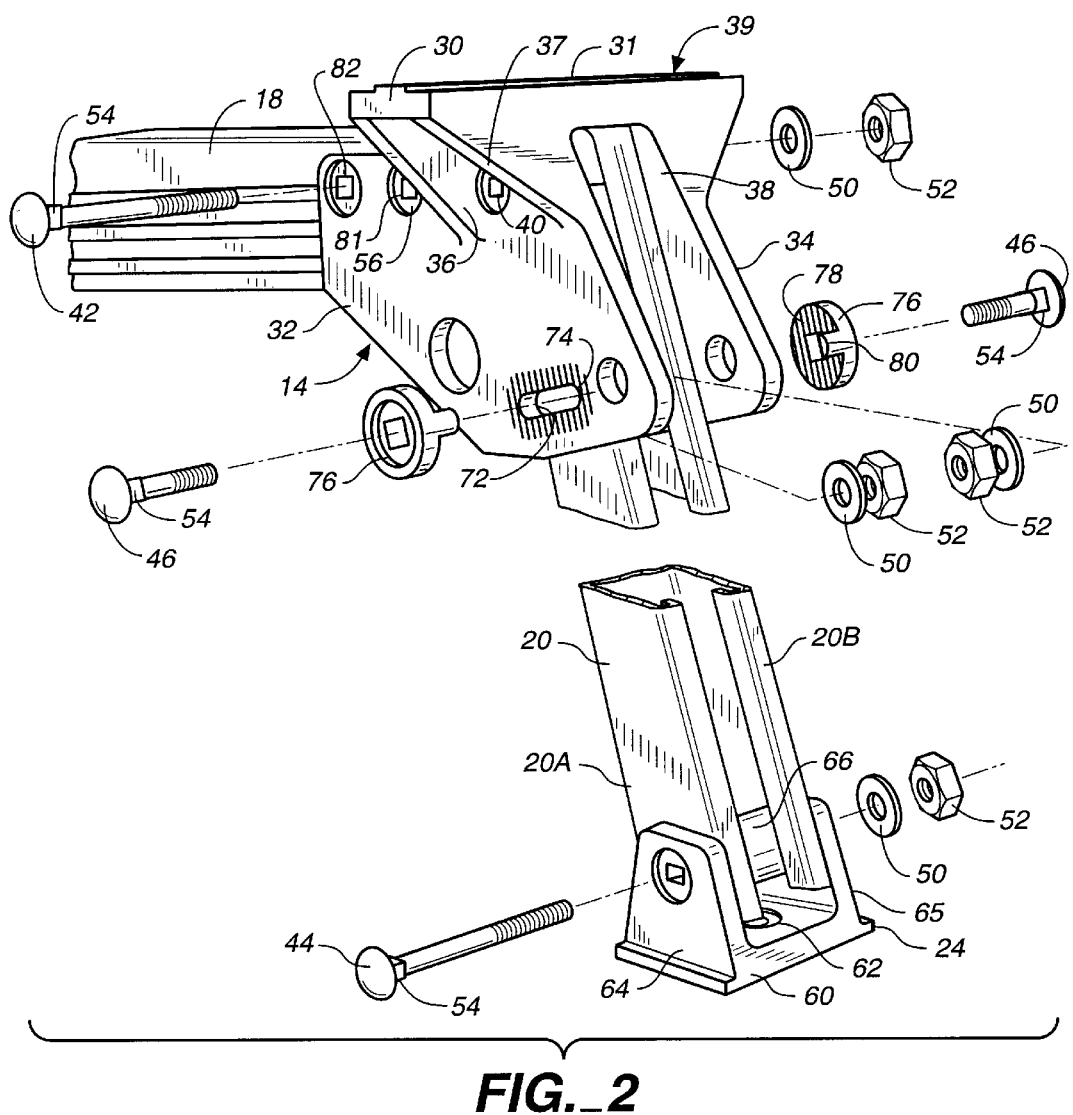
FIG._2

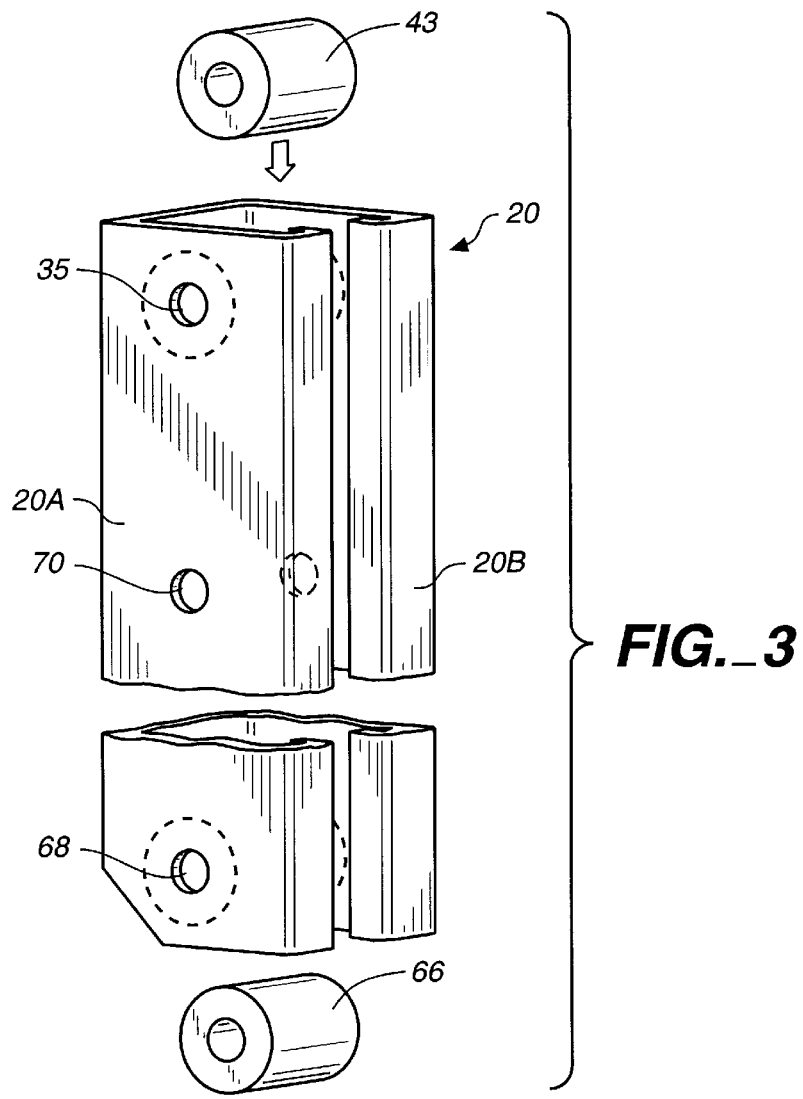
FIG._3
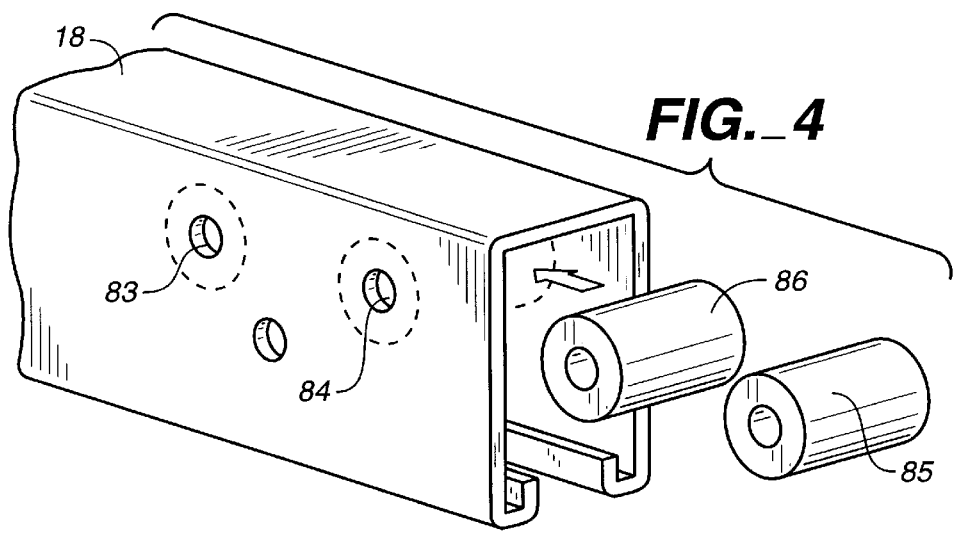
FIG._4

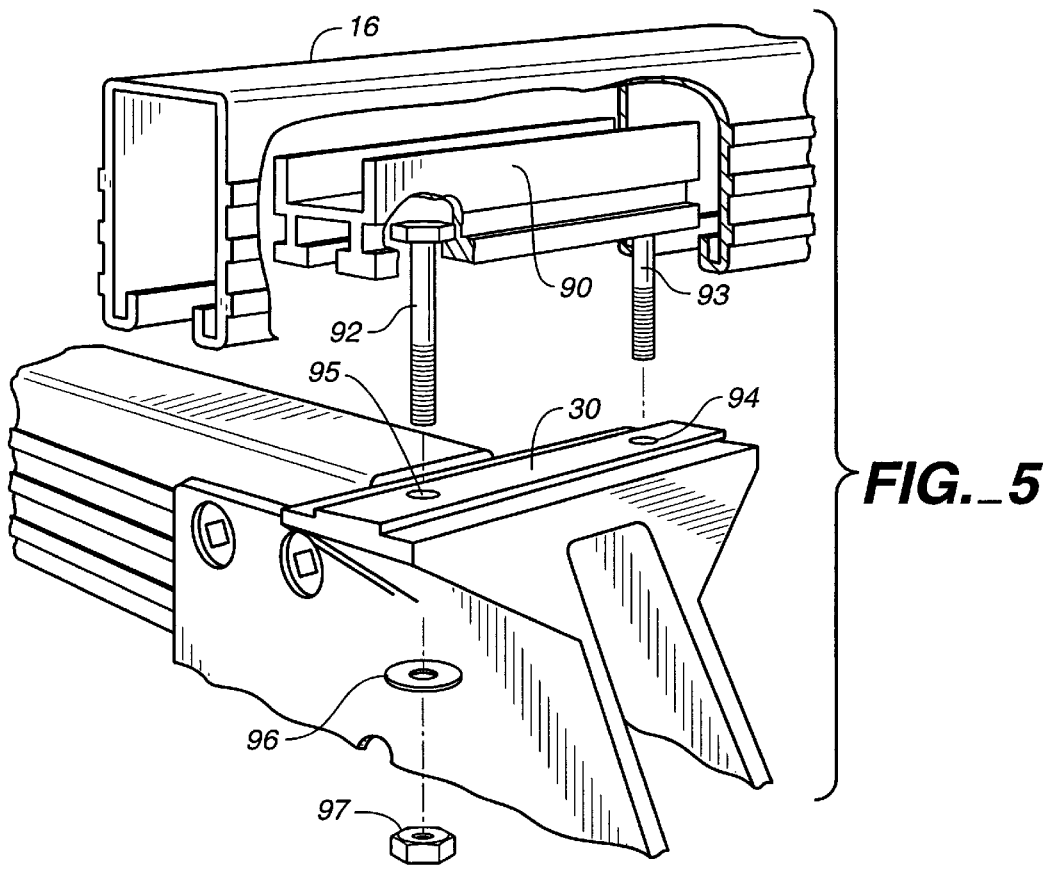
FIG._5
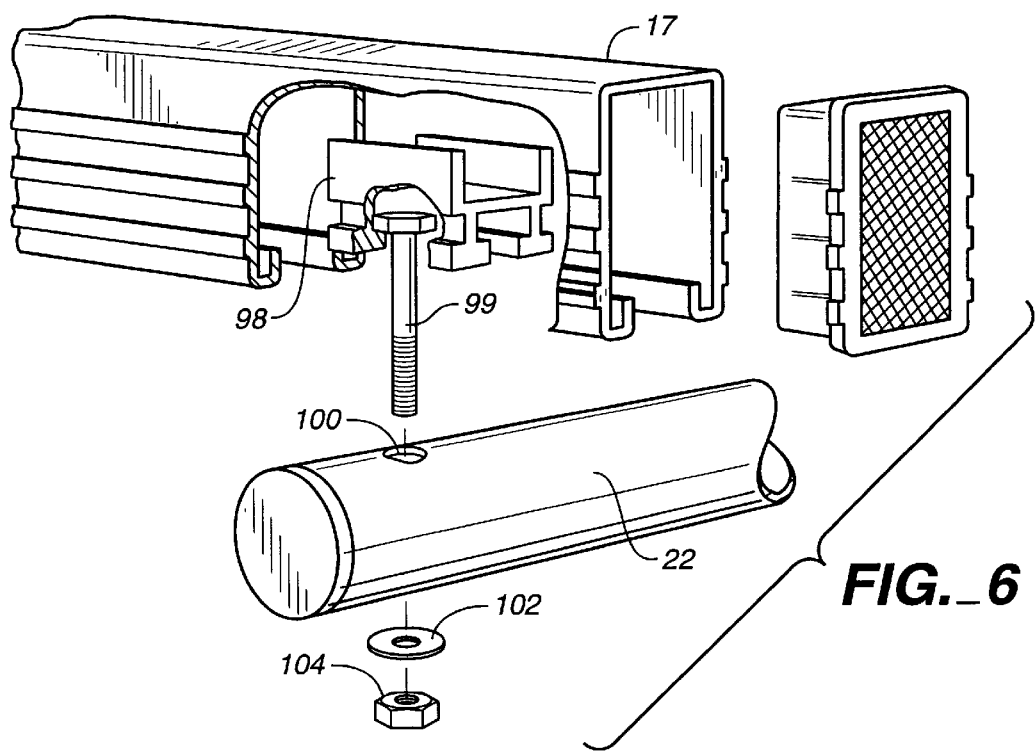
FIG._6

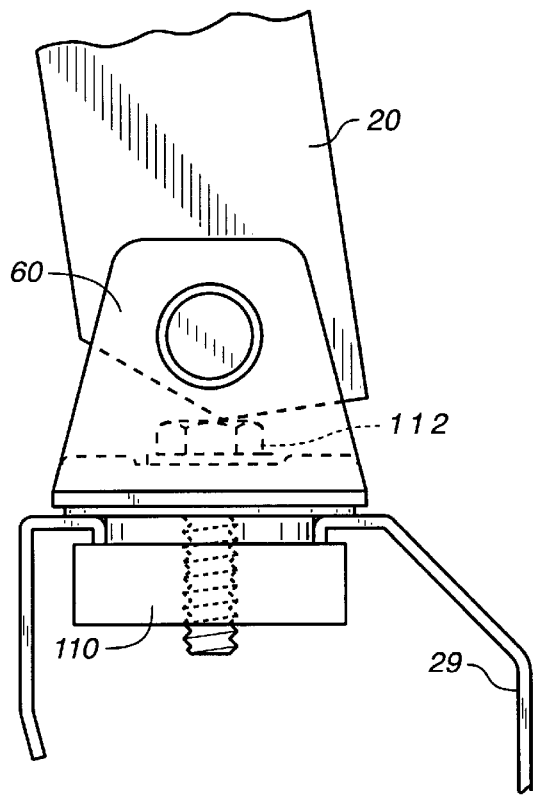
FIG._7A
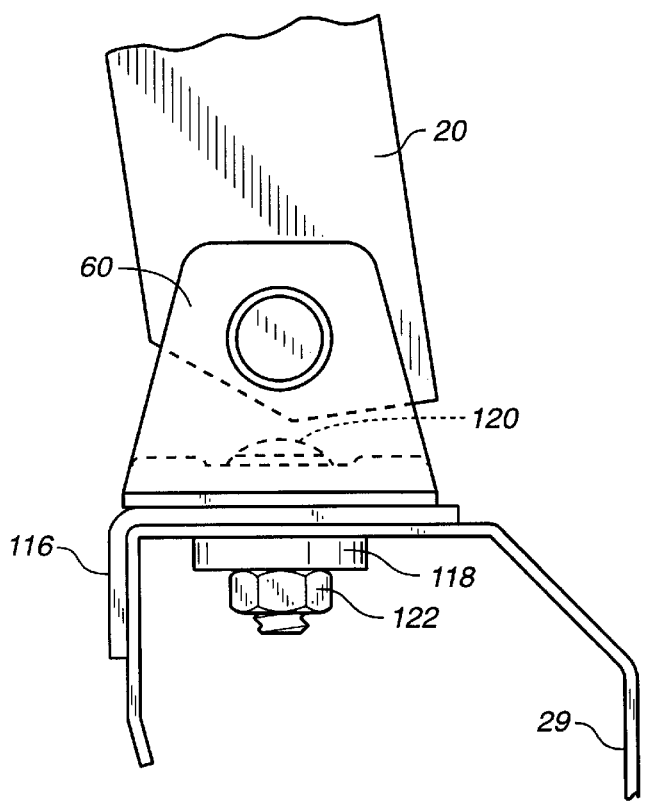
FIG._7B

OVERHEAD TRUCK RACK AND CORNER BRACKET

BACKGROUND OF THE INVENTION

1. Field of the Invention.

This invention relates to exterior rack systems for pickup trucks.

2. Prior Art.

An overhead rack for a pickup truck typically has a horizontal rectangularly shaped framework of rails. Each corner of the framework is joined with a metal plate to the top end of one of four vertically extending legs. The bottom ends of the legs are then attached to the top of the sidewalls of the pickup truck. The sidewalls extend upwardly from the bed of a full-size or compact pickup truck. As the pickup truck travels over an uneven roadway, the frame and bed of the pickup truck, whether loaded or not, dynamically twists and turns so that the attachment points at the bottom of the legs of the overhead rack can move up to an inch or so. This movement of the rack puts great stresses and strains on the joints between the framework and the legs. This requires that the joint be particularly strong to prevent the failure of the joints and to allow the rails and legs to flex.

The prior art used three separate metal plates to provide joining of a top rail, an end cross channel, and a leg.

Consequently, the need has arisen for an overhead rack with strong joints which allows flexure of the bed of a pickup truck to be transmitted to the rails and legs of the overhead rack.

SUMMARY OF THE INVENTION

It is therefore an object of the invention to provide an improved overhead rack for a pickup truck which includes four one-piece corner brackets to each of which are fastened: one end of a longitudinal rail, one end of a lateral rail, and an upper end of a leg. A corner bracket includes a horizontally disposed, one-piece, cantilevered top crosspiece to which is fastened one of the pair of longitudinal rails. Each of the corner brackets also includes two integral, spaced-apart side panels which downwardly depend from the top crosspiece. Between the spaced-apart side panels are positioned an end of one of the lateral rails and between the spaced-apart side panels is pivotably mounted an upper end of one of the legs to allow for lateral movement of the lower end of the legs to allow for adjustment of the lateral spacing of the lower ends of the legs. The lower ends of the legs are connected to respective brackets at respective mounting points on the body of the pickup truck. Each of the corner brackets also includes four integral support ribs which are connected a lower side of the cantilevered top piece and the outer sides of the two side panels to provide additional strength to the corner brackets.

The legs are U-shaped extrusions pivotally mounted at one end between the spaced-apart side panels with a carriage bolt and locking washers. Holes are formed through each leg and corresponding elongated slots are formed in the spaced-apart side panels to receive a respective bolt for locking a respective leg in various pivoted positions. Grooves are molded into the outside faces of the side panels adjacent to the elongated slots to provide positive engagement with correspondingly grooved surfaces in respective lock washers for the respective bolts. A spacer block is placed within the U-shaped extrusion of a leg to prevent the upper end of the leg from being deformed when a nut is fastened to the bolt for pivotably mounting the upper end of the leg. The lateral rails are U-shaped extrusions and respective holes are formed in the spaced-apart side panels and through the ends of the lateral rails to receive bolts for fixing the lateral rails to the corner brackets, also using spacer blocks. The longitudinal rails are U-shaped extrusions and respective holes are formed in the cantilevered top crosspiece for receiving bolts for fastening the longitudinal rail to the top crosspiece. The one-piece corner brackets are injection-molded plastic pieces made of a mixture of Kevlar, glass, and nylon. A plurality of carriage bolts and lock nuts are provided for fastening the longitudinal rails, the lateral rails, and an upper end of a leg to a respective corner bracket.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an isometric view of an overhead rack for a pickup truck according to the invention.

FIG. 2 is a partially exploded, isometric view of a lateral rail and a leg to be assembled to a one-piece corner bracket according to the invention.

FIG. 3 is an exploded, shortened isometric view of a leg with spacer blocks for both the top end and the bottom end of the leg.

FIG. 4 is an exploded, isometric view of one end of a lateral rail and two spacer blocks.

FIG. 5 is an exploded, isometric view showing the assembly of a longitudinal rail to a corner bracket.

FIG. 6 is an exploded, isometric view showing assembly of a support tube to the front end of a longitudinal rail.

FIG. 7A is a partially sectional, side view illustrating attachment to a wall of a pickup truck of a pocket-mounted foot for a leg of an overhead rack.

FIG. 7B is a partially sectional, side view illustrating attachment to a wall of a pickup truck of a hard-mounted foot for a leg of an overhead rack.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 illustrates an overhead rack system 10 for a pickup truck 12. The longitudinal, or long, direction is defined as the direction from front to back of the pickup truck. The lateral, or width, direction is defined as the direction from side to side of the pickup truck. The rack includes four one-piece, molded corner brackets 14 for each corner of the overhead rack 10. To each corner bracket are fastened one end of one of a pair of longitudinal rails 16, 17; one end of one of a pair of front and rear lateral rails 18, 19; and an upper end of one of four legs 20. A support tube 22 is fixed to the bottom side of the front ends of the longitudinal rails 16, 17. The lower ends of the legs 20 are fastened to respective molded feet brackets 24, which are mounted to the top of the front wall 26 and the sidewalls 28, 29 of the bed of the pickup truck 12.

The front and rear lateral rails 18, 19 are fixed in length so that the overhead rack 10 is adjusted in width by pivoting the legs 20 sideways so that the bottom ends of the legs attach to corresponding feet 24 on top of the walls of the pickup. Because the frame and bed of a pickup truck can dynamically twist and turn, the locations of the feet at the bottom of the legs 20 can dynamically move up to an inch or so from their rest positions. This requires that the joint provided by the corner brackets 14 for the longitudinal rails 16, 17; the front and rear lateral rails 18, 19; and the legs 20 be particularly strong to prevent the failure of that joint while still allowing the long rail and leg members of the overhead rack system to flex and twist as needed.

FIG. 2 shows a molded plastic corner bracket 14 and a molded foot bracket 24 which are formed as injection-molded plastic pieces made of a mixture of Kevlar, glass, and nylon.

The corner bracket 14 includes a horizontally disposed, longitudinally extending, elongated one-piece, cantilevered top crosspiece 30 which extends longitudinally and to which is fastened one of the pair of longitudinal rails. The cantilevered top crosspiece 30 includes a raised longitudinally extending central ridge 31 which defines adjacent shoulders on each longitudinal edge of the top crosspiece for engagement with complementary portions of the longitudinal rails 16,17.

The corner bracket 14 also includes two integral, spaced-apart side plates, or panels, 32, 34 which depend downwardly and laterally from the top crosspiece 30. The plates are oriented to extend in laterally extending planes which are perpendicular with respect to the longitudinal direction of the top crosspiece 30.

The corner bracket 14 also includes a first pair of triangularly shaped integral support ribs 36, 37 which extend from the lower side of one end of the elongated cantilevered top crosspiece 30 to the outer side of the side panel 32, as illustrated in FIG. 2, to provide additional strength to the one end of the cantilevered top crosspiece 30 of the corner bracket 14. A second pair of triangularly shaped integral support ribs 38, 39 extends from the lower side of the other end of the elongated cantilevered top piece 30 to the outer side of the side panel 34, also as illustrated in FIG. 2 to provide additional strength to the other end of the cantilevered top crosspiece 30 of the corner bracket 14.

In the space between the plates 32, 34 is pivotably mounted an upper end of a leg 20. This provides for lateral movement of the lower end of the leg 20 so that the lateral spacing of the lower ends of the leg can be adjusted to the positions of the feet brackets 24.

With reference to FIGS. 2 and 3, the leg 20 is formed as a U-shaped extrusion having spaced-apart sides 20A, 20B. Holes, typically shown as 35, are formed in the sides of the leg near the upper end of the leg 20. Corresponding holes, typically shown as 40, are formed in the spaced-apart side panel to receive a carriage bolt, typically shown as 42, for pivotably mounting the upper end of the leg 20 for lateral movement of the lower end of the leg. A molded spacer block 43 is placed in the upper end of the leg 20 to prevent the leg 20 and corner bracket 14 from being deformed or crushed by over tightening of fastening bolts.

As illustrated in FIG. 2, carriage bolts (typically shown as 42, 44, and 46) are secured with flat washers (typically shown as 50), and self-locking nuts (typically shown as 52). The holes 40 for the carriage bolts have square cross sections for receiving the squared upper shank 54 of the carriage bolt. The square holes 40 in the one-piece corner bracket allow carriage bolts and self-locking nuts, such as, for example, locking nuts, to be used for easy assembly by a customer. The threaded end of each carriage bolt passes through the flat washer 50, which is positioned in a shallow bore, typically shown as 56, formed into the outside surfaces of the side plates 32, 34 and through the locking nut 52.

The foot bracket 24 includes a base 60 with a central mounting hole 62 formed therethrough. Two mounting ears 64, 65 extend upwardly from the front and rear edges of the foot bracket. Each of the ears 64, 65 has a hole 40 therethrough with a square cross section and a shallow surface bore for alternatively receiving the square shank of the carriage bolt 44 or a washer 50. The lower end of the leg 20 has holes, typically shown as 68, formed therein for the carriage bolt. A locking nut 52 is threaded onto the end of the carriage bolt 44. A molded spacer block 66 is placed in the lower end of the leg 20 to prevent the leg 20 and foot bracket 24 from being deformed or crushed by over tightening of the fastening bolt 44.

With reference to FIGS. 2 and 3, holes, typically shown as 70, are also formed through the sides 20A, 20B of the leg 20 below its top end to receive the shanks of two carriage bolts 46. A pair of corresponding elongated slots, typically shown as 72, are formed through the side panels 32, 34. The side panels 32, 34 include a series of parallel grooves 74 which are molded into the outside faces of the side panels adjacent to the elongated slots 72. On the back side of each of two molded lock washers 76, are formed a corresponding series of parallel grooves 78 to provide positive engagement with the grooves 74. An outwardly extending tab 80 is also formed on the back side of each of the two molded lock washers 76 to engage the slot 72. The lock washers 76 also have square holes formed therethrough for receiving the square shanks of the carriage bolts 46. A pair of flat washers 50 and lock nuts 52 lock the leg 20 in a particular angular position.

With reference to FIGS. 2 and 4, the lateral rail 18 is a U-shaped extrusion. Two pairs of holes, typically shown as 81, 82 are formed in the spaced-apart side panels 32, 34. Two other pairs of holes, typically shown as 83, 84 are formed through the ends of the lateral rails to receive carriage bolts for fixing the lateral rail 18 to the corner bracket 14. A pair of spacer blocks 85, 86 are placed within the U-shaped extrusions of the lateral rails to prevent the end of the longitudinal rail from being deformed when a nut is fastened to a carriage bolt.

Referring to FIG. 5, the longitudinal rail 16 is a U-shaped extrusion, each end of which is fixed to the cantilevered top crosspiece 30 using a bolt track 90. The bolt track 90 is an aluminum extrusion with a longitudinal slot formed on its lower side for capturing the hex heads of two bolts 92, 93 as illustrated in FIG. 5. The bolts extend through holes 94, 95 in the top crosspiece 30 and are fastened with washers, typically shown as 96, and nuts, typically shown as 97.

FIG. 6 shows assembly of one end of the support tube 22 to the front end of the longitudinal rail 17. A smaller bolt track 98 has a lower track which captures the hex head of a bolt 99 which passes through a hole, typically shown as 100, in the support tube 22. A flat washer 102 and lock nut 104 are attached to the bolt 99.

FIG. 7A illustrates typical attachment of a foot bracket 24 to a pocket anchor block 110 on the wall 29 of a pickup truck using a bolt 112 threaded into the anchor block.

FIG. 7B illustrates a typical hard-mounted attachment of a foot bracket 24 to the wall 29 of a pickup truck using a bulk load bracket 116 and a thick washer 118 through which a bolt 120 passes for connection to a self locking nut 122.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

I claim:

1. An improved overhead rack for mounting to the body of a pickup truck, comprising:
    a pair of longitudinal rails which extend along the length of a pickup truck in a longitudinal direction;
    a pair of lateral rails which extend across the width of the pickup truck in a lateral direction;
    four legs;
    four one-piece corner brackets to each of which are fastened: one of the pair of longitudinal rails, one end of one of the lateral rails, and an upper end of a leg;
    wherein each of the corner brackets includes a horizontally disposed, one-piece, longitudinally-extending cantilevered top crosspiece on top of which is fastened one of the pair of longitudinal rails;
    wherein each of the corner brackets also includes two integral, spaced-apart side laterally-extending panels, each of which downwardly depends from the longitudinally-extending cantilevered top crosspiece perpendicular to the laterally-extending cantilevered top crosspiece;
    wherein between the spaced-apart side panels of each corner bracket are positioned an end of one of the lateral rails and between each of the spaced-apart side panels is pivotably mounted an upper end of one of the legs to allow for lateral movement of the lower end of the legs to allow for adjustment of the lateral spacing of the lower ends of the legs;
    wherein the lower ends of the legs are connected to respective brackets at respective mounting points on the body of the pickup truck; and
    wherein each of the corner brackets also includes four longitudinally-extending integral support ribs which are connected to a lower side of the longitudinally-extending cantilevered top piece and which are also connected to outer sides of the two side panels to provide additional strength to the longitudinally-extending cantilevered top crosspieces of the corner brackets.

2. The overhead rack of claim 1 wherein the legs are U-shaped extrusions and wherein respective holes are formed in the spaced-apart side panels and through the upper ends of the legs to receive a bolt for pivotably mounting the upper end of a respective leg.

3. The overhead rack of claim 2 wherein respective additional holes are formed through each legs and wherein corresponding elongated slots are formed in the spaced-apart side panels to receive a respective bolt for locking a respective leg in a pivoted position.

4. The overhead rack of claim 3 wherein the side panels include grooves which are molded into the outside faces of the side panels adjacent to the elongated slots in the side panels to provide positive engagement with correspondingly grooved surfaces in respective lock washers for the respective bolts.

5. The overhead rack of claim 2 including a spacer block which is placed within the U-shaped extrusion of a leg and through which is formed a through hole for receiving the bolt for pivotably mounting the upper end of a respective leg such that the spacer block prevents the upper end of the leg from being deformed when a nut is fastened to the bolt for pivotably mounting the upper end of a respective leg.

6. The overhead rack of claim 1 wherein the lateral rails are U-shaped extrusions and wherein respective holes are formed in the spaced-apart side panels and through the ends of the lateral rails to receive bolts for fixing the lateral rails to the corner brackets.

7. The overhead rack of claim 6 including a spacer block which is placed within the U-shaped extrusions of the lateral rails and through which is formed a through hole for receiving the bolt for mounting the end of a respective longitudinal rail such that the spacer block prevents the end of the longitudinal rail from being deformed when a nut is fastened to the bolt.

8. The overhead rack of claim 1 wherein the longitudinal rails are U-shaped extrusions and wherein respective holes are formed in the cantilevered top crosspiece for receiving bolts for fastening the longitudinal rail to the top crosspiece.

9. The overhead rack of claim 1 wherein the one-piece corner brackets are injection-molded plastic pieces made of a mixture of Kevlar, glass, and nylon.

10. The overhead rack of claim 1 including a plurality of carriage bolts and locking nuts for fastening the longitudinal rails, the lateral rails, and an upper end of a leg to a respective corner bracket.

11. An improved overhead rack for mounting to the body of a pickup truck, comprising:
    a pair of longitudinal rails which extend along the length of a pickup truck in a longitudinal direction;
    a pair of lateral rails which extend across the width of the pickup truck in a lateral direction;
    four legs;
    four one-piece corner brackets to each of which are fastened: one of the pair of longitudinal rails, one end of one of the lateral rails, and an upper end of a leg;
    wherein each of the corner brackets includes a horizontally disposed, one-piece, longitudinally-extending cantilevered top crosspiece on top of which is fastened one of the pair of longitudinal rails;
    wherein each of the corner brackets also includes two integral, spaced-apart side laterally-extending panels, each of which downwardly depend from the longitudinally-extending cantilevered top crosspiece in a direction perpendicular to the laterally-extending cantilevered top crosspiece;
    wherein between the spaced-apart side panels of each corner bracket are positioned an end of one of the lateral rails and between each of the spaced-apart side panels is pivotably mounted an upper end of one of the legs to allow for lateral movement of the lower end of the legs to allow for adjustment of the lateral spacing of the lower ends of the legs;
    wherein the lower ends of the legs are connected to respective brackets at respective mounting points on the body of the pickup truck;
    wherein each of the corner brackets also includes longitudinally-extending integral support ribs which are connected to a lower side of the laterally-extending cantilevered top piece and which are also connected to outer sides of the two side panels to provide additional strength to the laterally-extending cantilevered top crosspiece of the corner brackets;

wherein the legs are U-shaped extrusions and wherein respective holes are formed in the spaced-apart side panels and through the upper ends of the legs to receive a bolt for pivotably mounting the upper end of a respective leg;

wherein respective additional holes are formed through each legs and wherein corresponding elongated slots are formed in the spaced-apart side panels to receive a respective bolt for locking a respective leg in a pivoted position; and wherein the side panels include grooves which are molded into the outside faces of the side panels adjacent to the elongated slots in the side panels to provide positive engagement with correspondingly grooved surfaces in respective lock washers for all respective bolts.

12. The overhead rack of claim 11 including a spacer block which is placed within the U-shaped extrusion of a leg and through which is formed a through hole for receiving the bolt for pivotably mounting the upper end of a respective leg such that the spacer block prevents the upper end of the leg from being deformed when a nut is fastened to the bolt for pivotably mounting the upper end of a respective leg.

13. The overhead rack of claim 11 wherein the lateral rails are U-shaped extrusions and wherein respective holes are formed in the spaced-apart side panels and through the ends of the lateral rails to receive bolts for fixing the lateral rails to the corner brackets.

14. The overhead rack of claim 13 including a spacer block which is placed within the U-shaped extrusions of the lateral rails and through which is formed a through hole for receiving the bolt for mounting the end of a respective longitudinal rail such that the spacer block prevents the end of the longitudinal rail from being deformed when a nut is fastened to the bolt.

15. The overhead rack of claim 11 wherein the longitudinal rails are U-shaped extrusions and wherein respective holes are formed in the cantilevered top crosspiece for receiving bolts for fastening the longitudinal rail to the top crosspiece.

16. The overhead rack of claim 11 wherein the one-piece corner brackets are injection-molded plastic pieces made of a mixture of Kevlar, glass, and nylon.

17. The overhead rack of claim 11 including a plurality of carriage bolts and locking nuts for fastening the longitudinal rails, the lateral rails, and an upper end of a leg to a respective corner bracket.

18. A one-piece corner bracket for an overhead rack adapted to be mounted to the body of a pickup truck, where the one-piece corner bracket is adapted to be fastened to one of a pair of longitudinal rails which extend along the length of the pickup truck in a longitudinal direction, to be fastened one end of one of a pair of lateral rails which extend across the width of the pickup truck in a lateral direction, and to be fastened an upper end of one of four legs, the one-piece corner bracket comprising:

a horizontally disposed, one-piece, longitudinally-extending cantilevered top crosspiece, the top of which is adapted having fastened thereto one of the pair of longitudinal rails;

two integral, spaced-apart side laterally-extending panels, each of which downwardly depend from the longitudinally-extending cantilevered top crosspiece perpendicular to the laterally-extending cantilevered top crosspiece;

where the space between the spaced-apart side panels of the corner bracket is adapted to receive an end of one of the lateral rails and wherein the space between each of the spaced-apart side panels is adapted to have pivotably mounted therein an upper end of one of the legs to allow for lateral movement of the lower end of the leg to allow for adjustment of the lateral spacing of the lower end of the leg when the lower end of the leg is connected to a respective bracket at a respective mounting points on the body of the pickup truck; and wherein the corner bracket also includes longitudinally-extending integral support ribs which are connected to a lower side of the laterally-extending cantilevered top piece and which are also connected to outer sides of the two side panels to provide additional strength to the laterally-extending cantilevered top crosspiece of the corner bracket.

19. The one-piece corner bracket of claim 18 wherein respective holes are formed in the spaced-apart side panels which holes are adapted for receiving a bolt for pivotably mounting an upper end of a U-shaped leg to the one-piece corner bracket.

20. The one-piece corner bracket of claim 19 wherein elongated slots are formed in the spaced-apart side panels of the bracket where the elongated slots are adapted to receive a respective bolt for locking the leg in a pivoted position.

21. The one-piece corner bracket of claim 20 wherein the side panels include grooves which are molded into the outside faces of the side panels adjacent to the elongated slots in the side panels to provide positive engagement with correspondingly grooved surfaces in respective lock washers for the respective bolts.

22. The one-piece corner bracket of claim 18 wherein holes are formed in the spaced-apart side panels and adapted to receive bolts for fixing the one end of a lateral rail to the corner bracket.

23. The one-piece corner bracket of claim 18 overhead rack of claim 1 wherein holes are formed in the cantilevered top crosspiece which holes are adapted for receiving bolts for fastening the longitudinal rail to the top crosspiece.

24. The one-piece corner bracket of claim 18 wherein the one-piece corner brackets is an injection-molded plastic piece made of a mixture of Kevlar, glass, and nylon.

* * * * *